(No Model.) 3 Sheets—Sheet 1.
S. BRIGHTMORE & A. DIXON.
MACHINE FOR MOLDING PLASTIC MATERIALS INTO BRICKS, &c.
No. 330,291. Patented Nov. 10, 1885.
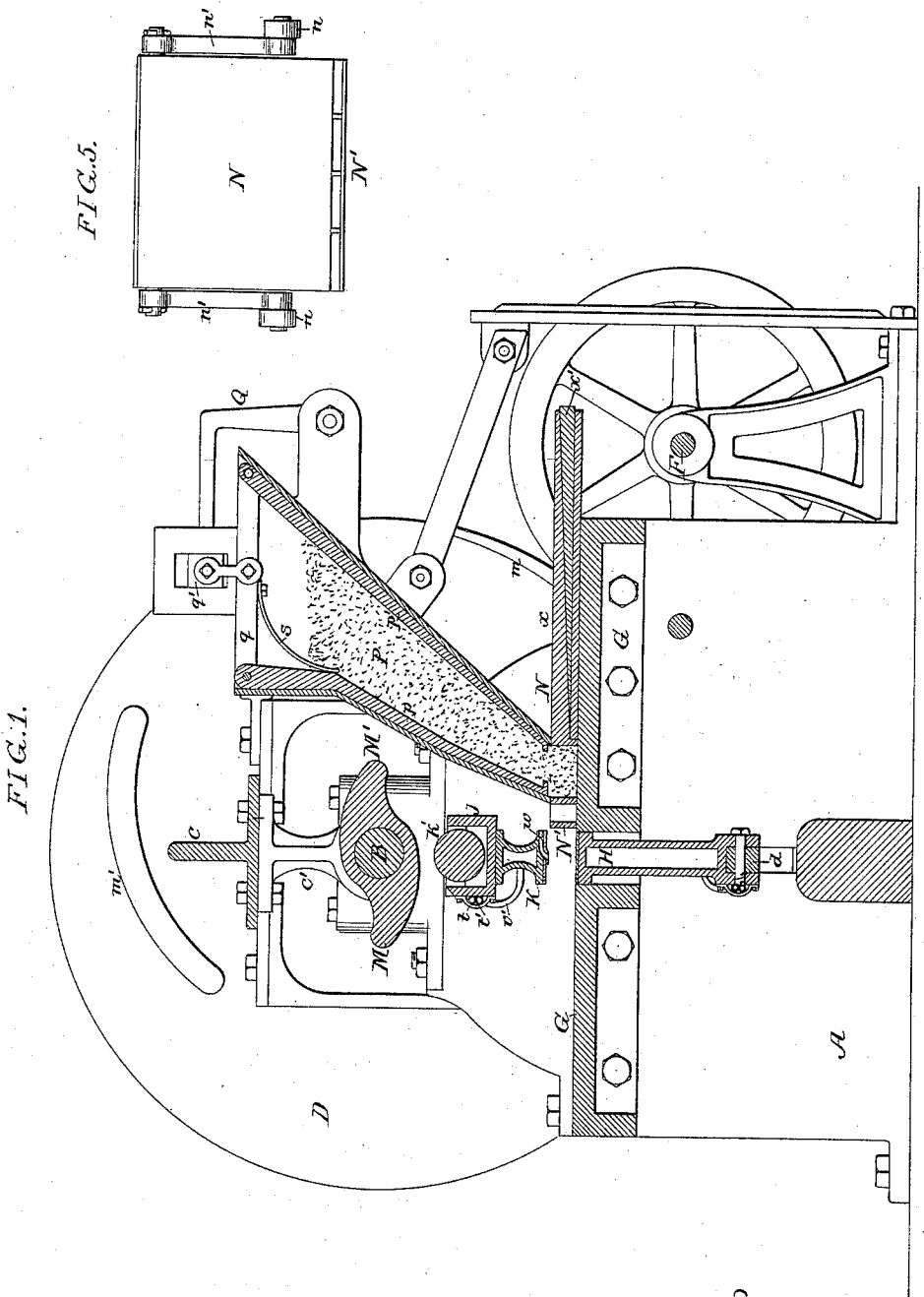
Witnesses:
Henry Bossert.
Harry Drury
Inventors:
Samuel Brightmore
and
Allen Dixon
by their Attorneys
Howson and Sons

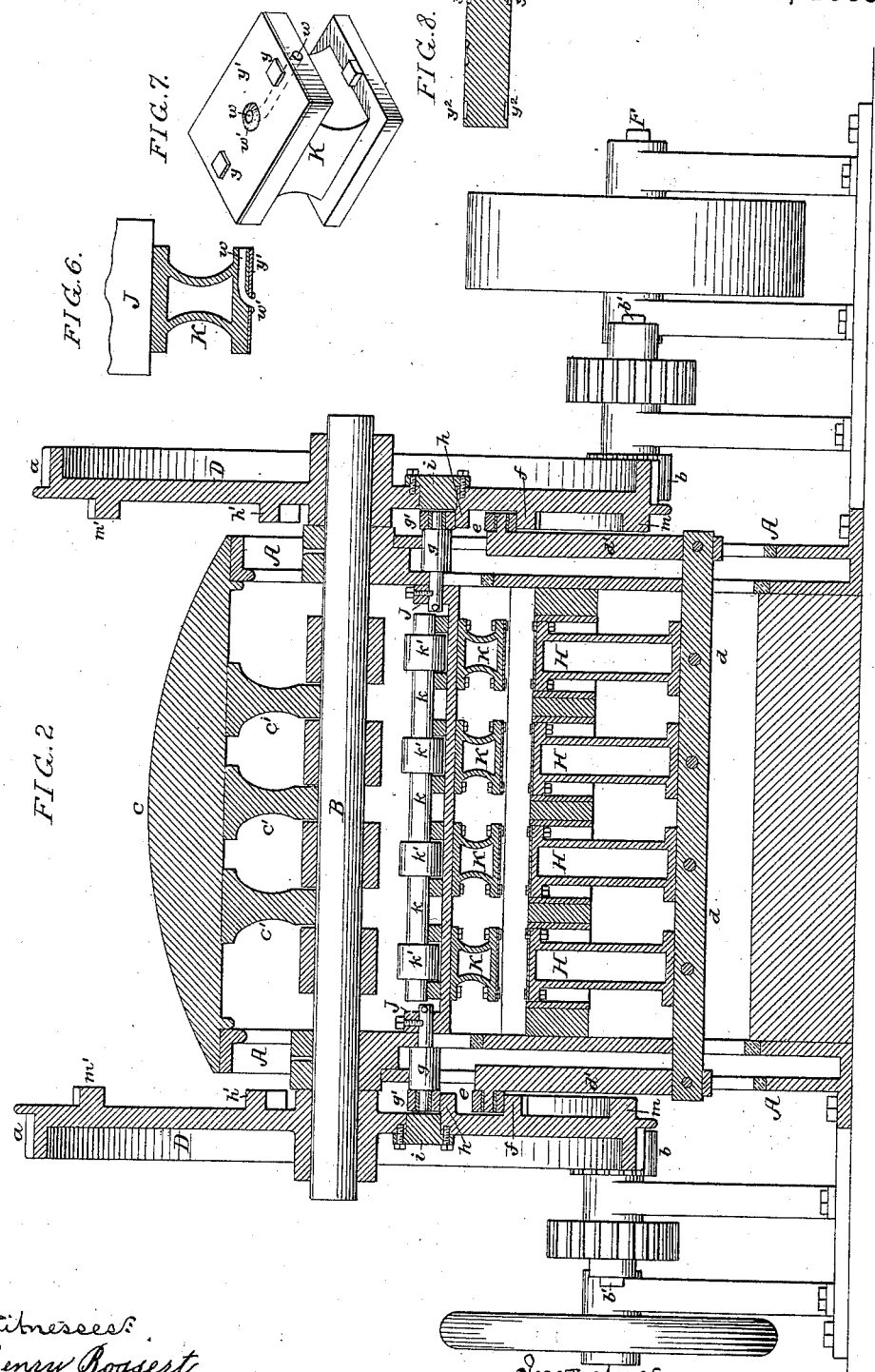

(No Model.) 3 Sheets—Sheet 3.
S. BRIGHTMORE & A. DIXON.
MACHINE FOR MOLDING PLASTIC MATERIALS INTO BRICKS, &c.
No. 330,291. Patented Nov. 10, 1885.
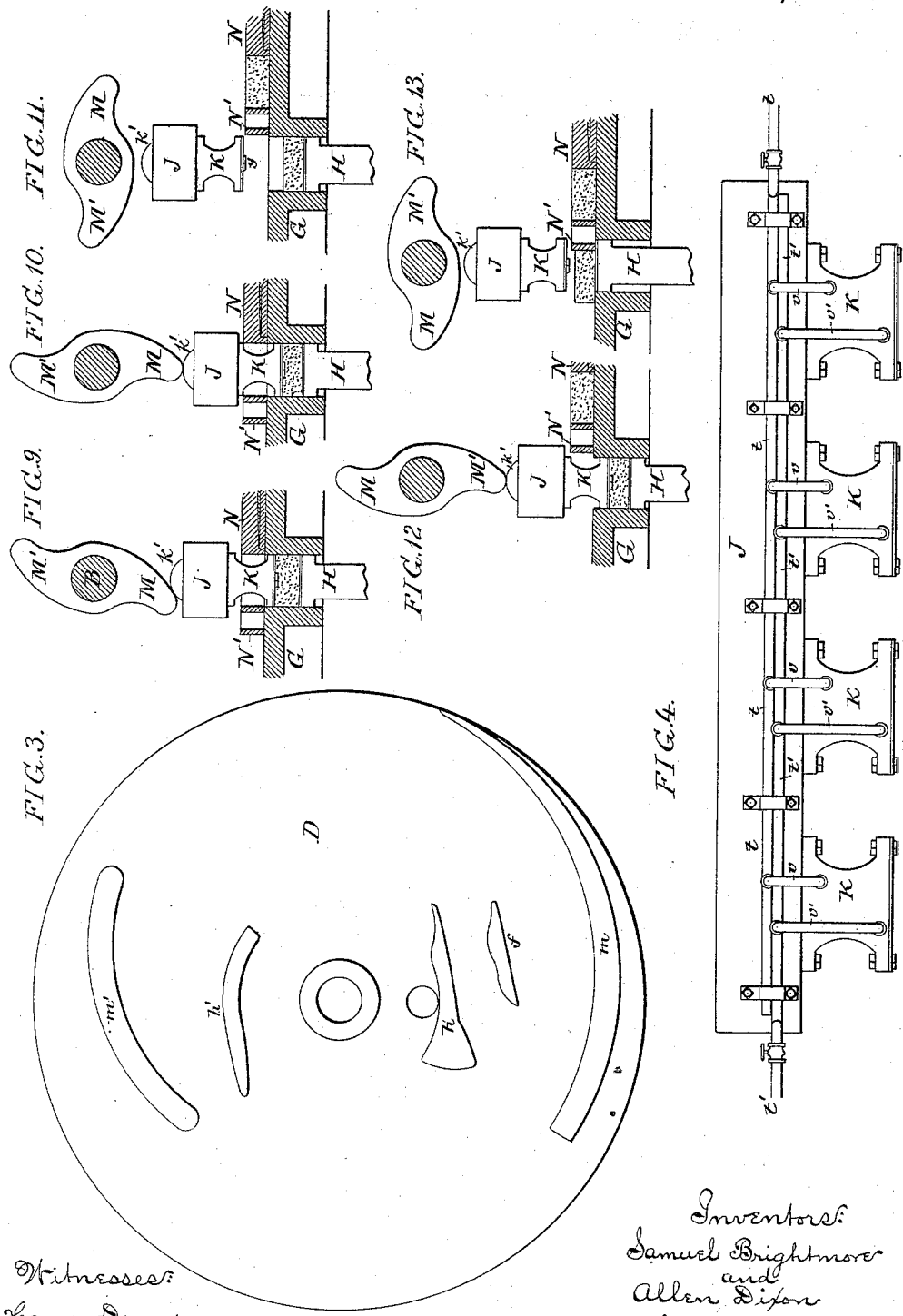

UNITED STATES PATENT OFFICE.

SAMUEL BRIGHTMORE AND ALLEN DIXON, OF PHILADELPHIA, PA.

MACHINE FOR MOLDING PLASTIC MATERIALS INTO BRICKS, &c.

SPECIFICATION forming part of Letters Patent No. 330,291, dated November 10, 1885.

Application filed April 27, 1885. Serial No. 163,546. (No model.)

*To all whom it may concern:*

Be it known that we, SAMUEL BRIGHTMORE, a citizen of the United States, and a resident of Philadelphia, Pennsylvania, and ALLEN DIXON, a subject of the Queen of Great Britain and Ireland, and a resident of Philadelphia, Pennsylvania, have invented certain Improvements in Machines for Molding Plastic Materials, of which the following is a specification.

Our invention relates to that class of machines for molding plastic substances in which a series of molds are used and a series of blocks produced at one operation, the term "plastic substances" applying to clay, whether tempered or in its natural or semi-dry state, or to compositions for the manufacture of blocks for building, paving, or other purposes.

Our invention consists of certain details in the construction of machines of this class, with the view of rendering them efficient in action, and of obtaining an improved product.

In the accompanying drawings, Figure 1 is a longitudinal section of our improved machine; Fig. 2, a transverse section of the same; Figs. 3, 4, 5, 6 and 7, detached views illustrating parts of the machine; Fig. 8, a sectional view of the molded block, and Figs. 9 to 13, diagrams illustrating the operation of the machine.

A A are the side frames of the machine, suitably braced or bolted to a proper foundation, these frames being provided with bearings for the main shaft B, bolted, keyed, or otherwise secured to which, at each end, is a cam-disk, D. The side frames of the machine are connected at the top by a transverse brace, C, depending from which are legs C', carrying at their lower ends bearing-blocks for the shaft B, so that the springing of the latter is prevented when the blocks of plastic material are being compressed in the molds, as described hereinafter. Forming part of each of the cam-disks is a spur-wheel, $a$, gearing into a pinion, $b$, on a counter-shaft, $b'$, which is geared to the driving-shaft F, the latter being adapted to bearings in suitable standards on the foundation, and receiving power from any adjacent counter-shaft by means of belts or gearing. Bolted to the opposite side-frames, A, of the machine is a bed or table, G, in which are formed a series of molds for the bricks or other block of plastic material to be produced, and adapted to these molds are plungers H, carried by a transverse bar, $d$, to the opposite ends of which are secured rods $d'$, carrying at the upper ends anti-friction rollers $e$, which are acted upon by cams $f$ on the opposite disks, D D. Suitably guided between the frames A A, above the molds, is a transverse frame, J, to the under side of which are secured a series of plungers, K, one for each mold, these plungers, as well as the lower plungers, H, being adapted to snugly fit the molds. The frame J has at its opposite ends projecting studs $g$, which carry anti-friction rollers $g'$, acted upon by cams $h\ h'$ on the disks D, and on the back of the frame J are bearings for a shaft, $k$, on which are a series of rolls or collars, $k'$, upon which act tappets M M' on the main shaft B. Detachable plugs $i$ in the disk, D permit access to the anti-friction rollers $g'$ without disturbing said disks or the frame J. Resting on the table G is a feed-box, N, which is reciprocated by means of cams $m\ m'$ on the disks D, these cams acting upon anti-friction rollers $n$, carried by arms $n'$, secured to the opposite sides of the feed-box. (See Fig. 5.)

Supported on the frame of the machine above the table G is an inclined hopper, P, which supplies material to the feed-box N, this hopper containing two blades, $p\ p'$, hung to opposite ends of an arm, $q$, suspended by means of a link from a guided box, $q'$, above the hopper, a vertical reciprocating motion being imparted to this box from a suitable cam or crank operated by the shaft B, and acting through the medium of a bell-crank lever, Q. As the bar Q is lifted, the plate $p$ is thrust inward, owing to its bearing against one of the inclined sides of the hopper P, in contact with which it is held by a spring, $s$. When the bar descends, the opposite plate is thrust inward, by reason of its bearing against the opposite inclined side of the hopper, and the constant agitation of the material at the lower or discharge end of the hopper is thus insured, so as to prevent clogging of said hopper.

The upper and lower plungers of the machine are both hollow, and are intended to be heated by steam, so as to dry or partially dry the opposite faces of the brick and insure their free and clean delivery from the plungers.

In order to supply steam to the upper plungers, the frame J carries two pipes, $t\ t'$, the former being in communication with a steam-supply pipe and the latter with an exhaust-pipe. The pipe $t$ is in communication with the interior of each of the plungers through a branch, $v$, and a similar communication is established between the interior of the plungers and the pipe $t'$ by means of branches $v'$, Fig. 4, so that a constant circulation of steam through the plungers is effected. A similar arrangement of pipes and branches is carried by the lower bar, $d$, in order to supply the lower plungers, H. The feed-box has an adjustable upper plate, $x$, the position of which is governed by the adjustment of a wedge, $x'$, Fig. 1, so that said plate can be caused at all times to bear firmly against and make a tight joint with the lower end of the hopper P, and permit the elevation of said hopper, so as to practically deepen the feed-box and increase the capacity of the same to suit different clays.

The operation of the machine will be understood on reference to the diagrams, Figs. 9 to 13. The feed-box moves forward and deposits its charge of material in the molds when the lower plungers are down, but while the upper plungers are still retained in an elevated position by the cams $h$. As soon as the latter release the frame J, however, said frame and its plungers fall, the plungers passing down through the feed-box and driving all the material therefrom into the molds, as shown in Fig. 9.

The first pressure upon the material is caused by the action of the tappets M upon the collars $k'$ of the shaft $k$, carried by the frame J, as shown in Fig. 10, and after this initial pressure has been imparted the upper plungers are raised by the action of the cams $h'$, and the feed-box is retracted by the cams $m'$, to receive a fresh charge of material from the feed-hopper, as shown in Fig. 11. Before the feed-box again advances, however, the cams $h'$ release the frame J, carrying the upper plungers, and said plungers descend into the molds, and the material is again subjected to pressure, owing to the action of the tappets M'. (See Fig. 12.) Both sets of plungers are then raised together by the action of the cams $f$ and $h$, and on the first part of the forward movement of the feed-box, due to the cams $m$, the push-bar N', carried by the front end of the feed-box, moves the finished blocks from the upper ends of the plungers H onto the table G, Fig. 12, from which they are removed by hand, or by an endless belt or other suitable means. Each of the upper plungers has formed in it a vent-opening, $w$, for the discharge of any surplus material from the mold, and when the plunger rises from the face of the block this surplus material is broken off, thus in some cases leaving a rough projection. In order that this projection may not interfere with the desired flat surface of the block, I form around the mouth of the vent-opening $w$ an annular rib, $w'$, Figs. 6 and 7, which forms in the face of the block a recess for containing the projection due to the breaking off of the surplus material, this recess also serving for the lodgment of the cement or mortar used in building, and thereby increasing the security of the joints between adjacent blocks. For the same reason the nuts $y$, whereby the detachable face-plates $y'$ of the plungers H and K are held in place, are permitted to project above the faces of said plates, so as to form in the upper and lower faces of the blocks, near the ends, recesses $y^2$ for a similar purpose. (See Fig. 8.)

In constructing our machine for the purpose of re-pressing-blocks the feed-hopper may be dispensed with, and in its place may be used an intermittently-operating feed-belt, whereby roughly-formed blocks may be delivered to the feed-box for transfer to the molds for the purpose of receiving therein supplementary pressure, as in ordinary re-pressing-machines.

We claim as our invention—

1. The combination of the table and its molds, upper and lower transverse plunger-carriers guided in the frame, and a transverse shaft having at its opposite ends cam-disks for acting upon both sets of plunger-carriers, as set forth.

2. The combination of the table and its molds, the upper transverse plunger-carrier guided in the frame, and a transverse shaft having at the opposite ends cam-disks acting upon the projecting opposite ends of the plunger-carrier, said shaft being also provided with tappets, whereby a molding-pressure is imparted to the plunger-carrier, as specified.

3. The combination of the guided plunger-frame J, having a shaft, $k$, with collars thereon, cams acting upon the opposite ends of the frame to raise the same, and tappets for acting on the collars of the shaft to depress the frame, as specified.

4. The combination of the guided plunger-frame having projecting studs with anti-friction rollers $g'$ thereon, and the cam-disks D, having removable plugs $i$, for permitting access to said rollers, as specified.

5. The combination of the molds, the upper plunger-carrier, and the tappet-shaft B, with a frame having a transverse brace, C, with bearings which serve to prevent springing of the shaft, as set forth.

6. The combination of a series of plungers and a plunger-carrier, with steam supply and discharge pipes secured to said carrier, and having branches whereby each plunger is caused to communicate with each of the pipes, as specified.

7. The combination of the feed-hopper having inclined sides, the internal agitating-plates having a bearing against the sides of the hopper, and means for reciprocating said plates, as specified.

In testimony whereof we have signed our names to this specification in the presence of two subscribing witnesses.

SAML. BRIGHTMORE.
    ALLEN DIXON.

Witnesses:
 HENRY BOSSERT,
 HARRY SMITH.